United States Patent
Gong et al.

(10) Patent No.: US 10,965,801 B2
(45) Date of Patent: Mar. 30, 2021

(54) METHOD FOR INPUTTING AND PROCESSING PHONE NUMBER, MOBILE TERMINAL AND STORAGE MEDIUM

(71) Applicant: JRD COMMUNICATION (SHENZHEN) LTD., Shenzhen (CN)

(72) Inventors: Aimin Gong, Shenzhen (CN); Yaoting Wei, Shenzhen (CN); Chao Li, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 16/851,146

(22) Filed: Apr. 17, 2020

(65) Prior Publication Data

US 2020/0244792 A1 Jul. 30, 2020

Related U.S. Application Data

(63) Continuation-in-part of application No. PCT/CN2018/111006, filed on Oct. 19, 2018.

(30) Foreign Application Priority Data

Oct. 20, 2017 (CN) .......................... 201710983378.1

(51) Int. Cl.
*G06K 9/00* (2006.01)
*H04M 1/72403* (2021.01)
*G06F 40/109* (2020.01)

(52) U.S. Cl.
CPC ...... *H04M 1/72403* (2021.01); *G06F 40/109* (2020.01); *G06K 9/00456* (2013.01); *G06K 9/00469* (2013.01)

(58) Field of Classification Search
CPC ... H04M 1/72; G06L 40/109; G06K 2209/01; G06K 9/3233; G06K 9/34; G06K 9/00456
See application file for complete search history.

(56) References Cited

U.S. PATENT DOCUMENTS 9,189,694 B2 * 11/2015 Tonogai ................. G06K 9/723
2005/0037806 A1 * 2/2005 Na ...................... H04M 1/2755
455/556.1

(Continued)

FOREIGN PATENT DOCUMENTS

| CN | 1655951 A | 11/2006 |
|----|-----------|---------|
| CN | 101651938 A | 2/2010 |
| CN | 102761668 A | 10/2012 |

OTHER PUBLICATIONS

International search report, PCT/CN2018/111006, dated Jan. 30, 2019(3 pages).

*Primary Examiner* — Michael T Vu (57) ABSTRACT

A method for inputting and processing phone number is provided. The method includes: taking or storing a picture P1 including a phone number; obtaining a picture P2 including only the phone number by automatically processing the picture P1 and saving the picture P2; obtaining editable character strings of the phone number in the picture P2 by automatically recognizing the phone number in the picture P2; determining whether a format of the editable character strings of the phone number in the picture P2 is consistent with a standard format of the contact information of the mobile terminal; when consistent, the phone number in the picture P2 is displayed in the dialing interface for dialing or saving; and when not consistent, the phone number in the picture P2 is displayed in a modifying interface for correcting.

20 Claims, 4 Drawing Sheets

(56) References Cited

U.S. PATENT DOCUMENTS

2015/0347852 A1 12/2015 Laaksonen
2020/0159392 A1* 5/2020 Choi .................... H04W 4/029

* cited by examiner

METHOD FOR INPUTTING AND PROCESSING PHONE NUMBER, MOBILE TERMINAL AND STORAGE MEDIUM

CROSS REFERENCE TO RELATED APPLICATIONS

The present application is a continuation-in-part of International (PCT) Patent Application No. PCT/CN2018/111006 filed on Oct. 19, 2018, which claims priority to the Chinese patent application No. 201710983378.1, entitled "METHOD FOR PROCESSING TYPED IN PHONE NUMBER, MOBILE TERMINAL AND STORAGE MEDIUM" and filed to the National Intellectual Property Administration of China on Oct. 20, 2017, the entire contents of which are hereby incorporated by reference in their entireties

TECHNICAL FIELD

This disclosure relates to the field of mobile terminal technology, in particular, relates to a method for inputting and processing phone numbers, a mobile terminal and a storage medium.

BACKGROUND

In the related art, when a phone number is stored by a mobile terminal such as a mobile phone, the digits of the phone number is usually input and saved one by one, and even the wrong number may be input or saved. Thus, it takes several minutes to input and check so as to ensure that the phone number is recorded correctly. In the company, there are more than one address book, or there may be hundreds or even more. It will not only take a long time to input one by one and waste time, but also be easier to make mistakes and cause low work efficiency and inconvenience.

Furthermore, in the related art, the phone numbers that need to be input into the address book are made into text format and then converted into anther format that can be recognized by the mobile terminal for import. However, different mobile terminals have different format of the address book. Thus, it is very inconvenient for the user to import the phone numbers after multiple transformations.

In addition, when there are not many phone numbers that need to be input, it is very easy for the user to paste the information irrelevant to the phone number in the process of saving the phone numbers by copying and pasting. At this time, the irrelevant information needs to be deleted before saving the phone numbers. It is easy to cause the user to delete the phone number by mistake, and needs to copy the phone number again. When the phone number is recorded on white paper or notebook, the user cannot process the phone number by copying and pasting.

Therefore, there is room for improvement and development in this art.

SUMMARY

In one embodiment, a method for inputting and processing phone number in a mobile terminal is provided. The method for inputting and processing phone number including; acquiring a picture P1 comprising a phone number; obtaining a picture P2 comprising only the phone number by automatically processing the picture P1 and saving the picture P2; obtaining editable character strings of the phone number in the picture P2 by automatically recognizing the phone number in the picture P2; determining whether a format of the editable character strings of the phone number in the picture P2 is consistent with a standard format of the contact information of the mobile terminal; and in response to the format of the character strings of the phone number in the picture P2 being consistent with the standard format of the contact information of the mobile terminal, displaying the phone number in the picture P2 in the dialing interface for dialing or saving.

In one embodiment, a mobile terminal is provided. The mobile terminal includes a picture editing tool, a processor and a memory connected to the processor; the memory stores a program of a method for inputting and processing phone number, and the program is executed by a processor to realize the method for inputting and processing phone number. The method for inputting and processing phone number including; acquiring a picture P1 comprising a phone number; obtaining a picture P2 comprising only the phone number by automatically processing the picture P1 and saving the picture P2; obtaining editable character strings of the phone number in the picture P2 by automatically recognizing the phone number in the picture P2; determining whether a format of the editable character strings of the phone number in the picture P2 is consistent with a standard format of the contact information of the mobile terminal; and in response to the format of the character strings of the phone number in the picture P2 being consistent with the standard format of the contact information of the mobile terminal, displaying the phone number in the picture P2 in the dialing interface for dialing or saving.

In one embodiment, a non-transitory computer-readable storage medium is provided. The non-transitory computer-readable storage medium stores a program of the method for inputting and processing phone number, and the program is executed by a processor to realize the method for inputting and processing phone number. The method for inputting and processing phone number including; acquiring a picture P1 comprising a phone number; obtaining a picture P2 comprising only the phone number by automatically processing the picture P1 and saving the picture P2; obtaining editable character strings of the phone number in the picture P2 by automatically recognizing the phone number in the picture P2; determining whether a format of the editable character strings of the phone number in the picture P2 is consistent with a standard format of the contact information of the mobile terminal; and in response to the format of the character strings of the phone number in the picture P2 being consistent with the standard format of the contact information of the mobile terminal, displaying the phone number in the picture P2 in the dialing interface for dialing or saving.

BRIEF DESCRIPTION OF THE DRAWINGS

Implementations are described by way of example only with reference to the attached figures. The drawings here is used to further explain the present disclosure, and as a part of the application. The schematic embodiments of the present disclosure and the description are used to explain the present disclosure, and not as an improper limitation of the present disclosure.

DETAILED DESCRIPTION

In order to make the purpose, technical scheme and advantages of the disclosure clearer, the disclosure will be further described in detail with the drawings and embodiments. It should be understood that the specific embodiments described herein are only for the interpretation of the disclosure and are not for the limitation of the disclosure. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one. Unless otherwise defined, all technical and scientific terms used herein have the same meaning as a skilled person in the art would understand. The terminology used in the description of the present disclosure is for the purpose of describing particular embodiments and is not intended to limit the disclosure.

Figure 1:
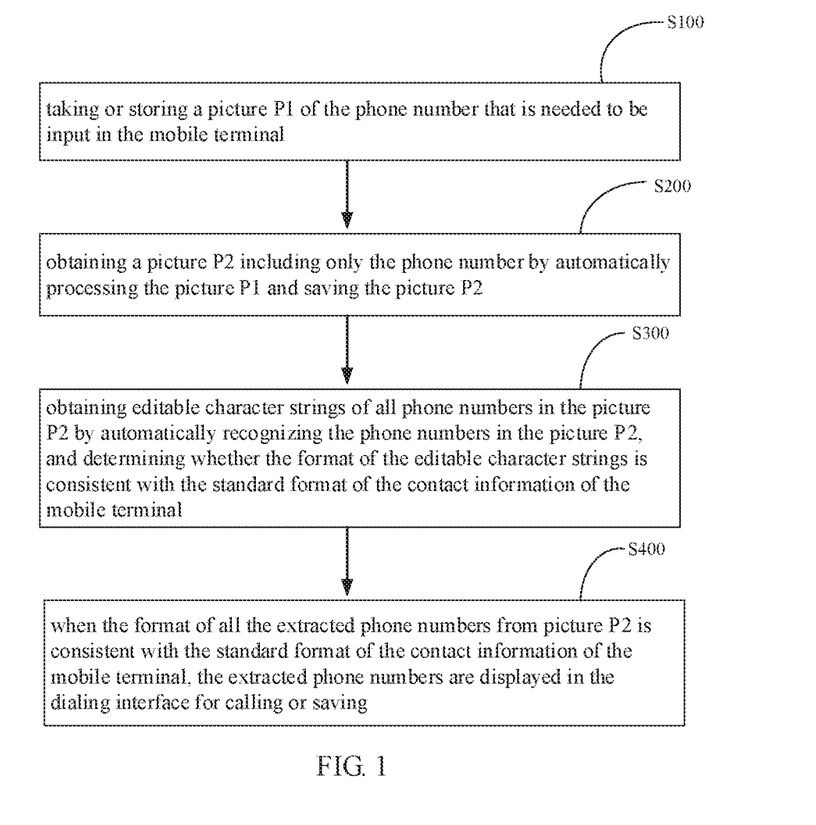
FIG. 1 is a flowchart of one embodiment of a method for inputting and processing phone number of this disclosure.

Referring to FIG. 1, a flowchart of one embodiment of a method for inputting and processing phone number of this disclosure is shown. As shown in FIG. 1, the method for inputting and processing phone number includes the following actions.

Action S100, taking or storing a picture P1 of the phone number that is needed to be input in the mobile terminal.

In one embodiment, the mobile terminal has the camera function, that is, the mobile terminal can take a picture. The picture P1 is taken by or stored in the mobile terminal, and the phone number in the picture P1 is clear and configured to be input in the mobile terminal. The content of the picture P1 can include the Chinese name (English name) and the phone number, or include the phone number and the address, etc. The content of the picture P1 is not limited to the example contents above, as long as the content of the picture P1 includes the phone number. However, it should be noted that, in one embodiment of the shooting process, only the content related to the phone number is necessary and photographed, such as the country/region code, landline phone number, mobile phone number, etc. By only photographing the content related to the phone number, the data processing amount can be reduced and the recognition accuracy can be improved.

Furthermore, the phone number in the picture P1 should be visible and clear enough for the human eyes to recognize, so that the recognition speed and accuracy can be improved.

Action S200, obtaining a picture P2 including only the phone number by automatically processing the picture P1 and saving the picture P2.

In one embodiment, the mobile terminal, such as a mobile phone, includes a picture editing tool Gallery. The processing the picture P1 includes: opening the image editing tool Gallery, selecting the picture P1 by the image editing tool Gallery, and checking whether the content of the picture P1 includes unwanted information except the phone number, such as address, native place and other information unrelated to the phone number. When the image editing tool Gallery detects unwanted information unrelated to the phone number, the user only selects the phone number area by a frame manually. Thus, the area in the frame is displayed in bright and the rest area outside the frame is displayed in dark, so that it is easy to distinguish the area in the frame and the area outside the frame, and ensure that the correct area is selected by the frame. After the area is selected by the frame, the part of the picture P1 including only the phone number will be cut out and saved as the picture P2.

It should be noted that, the picture editing tool Gallery can be used to manually select the phone numbers in the picture P1 at different positions continuously. Then, the selected phone numbers in the frames at different positions will be automatically cut out of the picture P1 and spliced into same one picture, such as Picture P2. In this way, the repeated operation can be reduced, and the phone number can be completely read and recognized. In addition, the checking whether the content of the picture P1 includes unwanted information can be performed by scanning the picture P1.

Furthermore, when it is detected that the picture P1 does not include any unwanted information, namely, only the phone number is in the picture P1, the picture P1 is kept unchanged and no cutting operation is required. Thus, the action S300 is directly executed after action 100.

Action S300, obtaining editable character strings of all phone numbers in the picture P2 by automatically recognizing the phone numbers in the picture P2, and determining whether the format of the editable character strings is consistent with the standard format of the contact information of the mobile terminal.

In one embodiment, the standard format of the contact information of the mobile terminal includes numeric characters of 11 digits, numeric characters of short number, common numeric characters and special numeric characters. The numeric characters of 11 digits can include 11 digits of the mobile phone number or the 11 digits of the landline phone number (area code+7 digits, or area code+8 digits). The numeric characters of short number can include 3-6 digits and is used for many users to intercommunicate with each other instead of 11 digits. The common numeric characters can include a general phone number, which is commonly known, such as fire alarm phone 119 in China, or danger alarm phone 911 in USA. The special numeric characters can include N characters including "+ country or region code" (such as +86) or mark "−", where N is equal to 11.

It should be noted that, the standard format of the contact information of the mobile terminal is not limited to the above four categories, and should be the characters in the common character library of the phone numbers.

Furthermore, the picture editing tool Gallery is improved to have the function of "recognizing the number in the picture". The specific operation process is as follows: the picture editing tool Gallery selecting the picture P2, the picture editing tool Gallery recognizing the picture P2 and extracting character strings of all phone numbers in the picture P2 after the user selects the "recognizing the number in the picture" in the menu of upper right corner, and then the picture editing tool Gallery automatically classifying the extracted character strings and showing the extracted character strings on the display screen of the mobile terminal. At this time, it is determined that whether the format of the extracted character strings is consistent with the standard format of the contact information of the mobile terminal.

For example, the content of the extracted phone number is shown as following (serial number 1, 2 and 3 below are only used to number the three extracted character strings and not displayed on the display screen of the mobile terminal).

| | | |
|---|---|---|
| 1 | 0755 | 8888888 |
| 2 | +86 | 11111111111 |
| 3 | | 18686.868686 |

The three extracted phone numbers are respectively compared with the common character library of the phone numbers on by one. For example, the format of the first extracted phone number is consistent with the format of the landline phone number, so the first extracted phone number is correct; the format of the second extracted phone number is consistent with the format of the special numeric characters, so the second extracted phone number is also correct. Then, the action S400 is performed.

When the format of the extracted phone numbers from picture P2 is not consistent with the standard format of the contact information of the mobile terminal, the extracted phone numbers is amended to correct format. For example, the third extracted phone number 18686.868686 is not consistent with the standard format of the contact information of the mobile terminal and will be displayed on a dialing interface. At this time, the user only needs to delete the dot symbol, so that a correct phone number 186868686 is obtained. This method not only reduces the error rate of manual imputing, but also saves the time of imputing phone number and improves efficiency of imputing phone number. In the process of recognizing, the image editing tool Gallery only recognizing the characters of numbers, character "+", and character "−", which reduces the workload of recognizing and classifying, and improves the recognizing speed and accuracy.

Action S400: when the format of all the extracted phone numbers from picture P2 is consistent with the standard format of the contact information of the mobile terminal, the extracted phone numbers are displayed on the dialing interface for dialing or saving.

In one embodiment, when the format of all the extracted phone numbers from picture P2 is consistent with the standard format of the contact information of the mobile terminal, all the automatically recognized correct character strings are combined and spliced into the phone numbers in the standard format and displayed in the editing area of dialing interface, such as in the first extracted phone number 0755 8888888 and the second extracted phone number +86 11111111111 as shown above. When multiple phone numbers in the standard format are obtained, the multiple phone numbers will be sequentially displayed on the dialing interface and arranged in the form of queue, such as the classification arrangement described above. At this time, the user can dial one of the phone numbers or save the phone numbers displayed on the dialing interface to the terminal address book one by one.

Figure 2A:
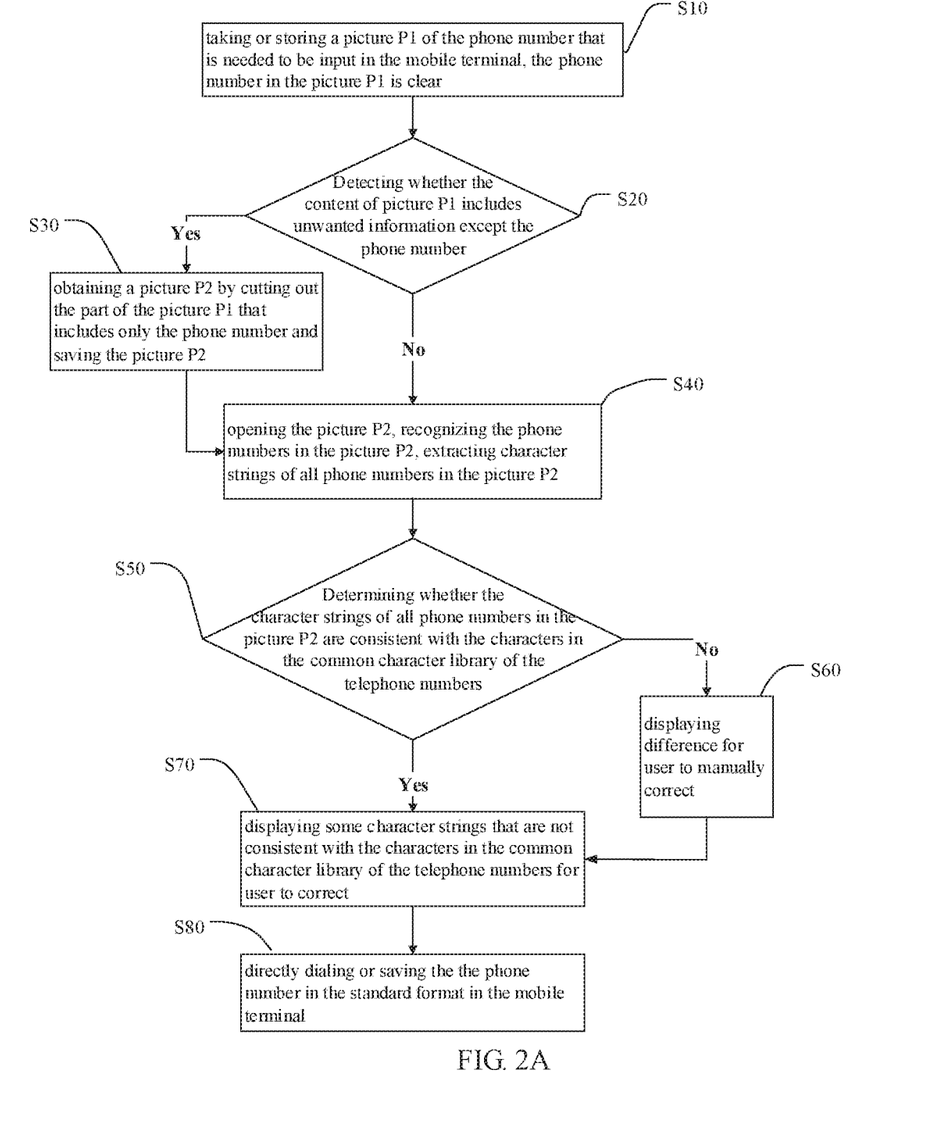
FIG. 2A is a flowchart of one embodiment of the method for inputting and processing phone number of this disclosure.

As shown in FIG. 2A, the method for inputting and processing phone number of one embodiment is described in detail as following.

Action 10, taking or storing a picture P1 of the phone number that is needed to be input in the mobile terminal, the phone number in the picture P1 is clear, and go to action S20.

Action 20, detecting whether the content of picture P1 includes unwanted information except the phone number; if yes, go to action S30; if no, go to action S40 and the picture P1 is used as the picture P2 of action 40.

Action 30, obtaining a picture P2 by cutting out the part of the picture P1 that includes only the phone number and saving the picture P2, and go to action S40.

Action 40, opening the picture P2, recognizing the phone numbers in the picture P2, extracting character strings of all phone numbers in the picture P2, and then go to action S50.

Action 50, determining whether the character strings of all phone numbers in the picture P2 are consistent with the characters in the common character library of the phone numbers; if yes, go to action S70, if no, go to action S60.

Action 60, displaying difference for user to manually correct; then go to action S70.

Action 70, splicing the character strings of all phone numbers in the picture P2 into the phone numbers in the standard format, and displaying the phone number in the standard format on the dialing interface.

Action 80, directly dialing or saving the phone number in the standard format in the mobile terminal.

Of course, one of ordinary skill in the art can understand that, all or part of the actions in the method of the above embodiment can be realized by instructing related hardware (such as processor, etc.) through a program of the method for inputting and processing phone number. The program can be stored in a computer readable storage medium, and the program can include the actions in the above embodiments of the method when the program is executed. The storage medium can be memory, disk, optical disc, etc.

Figure 2B:
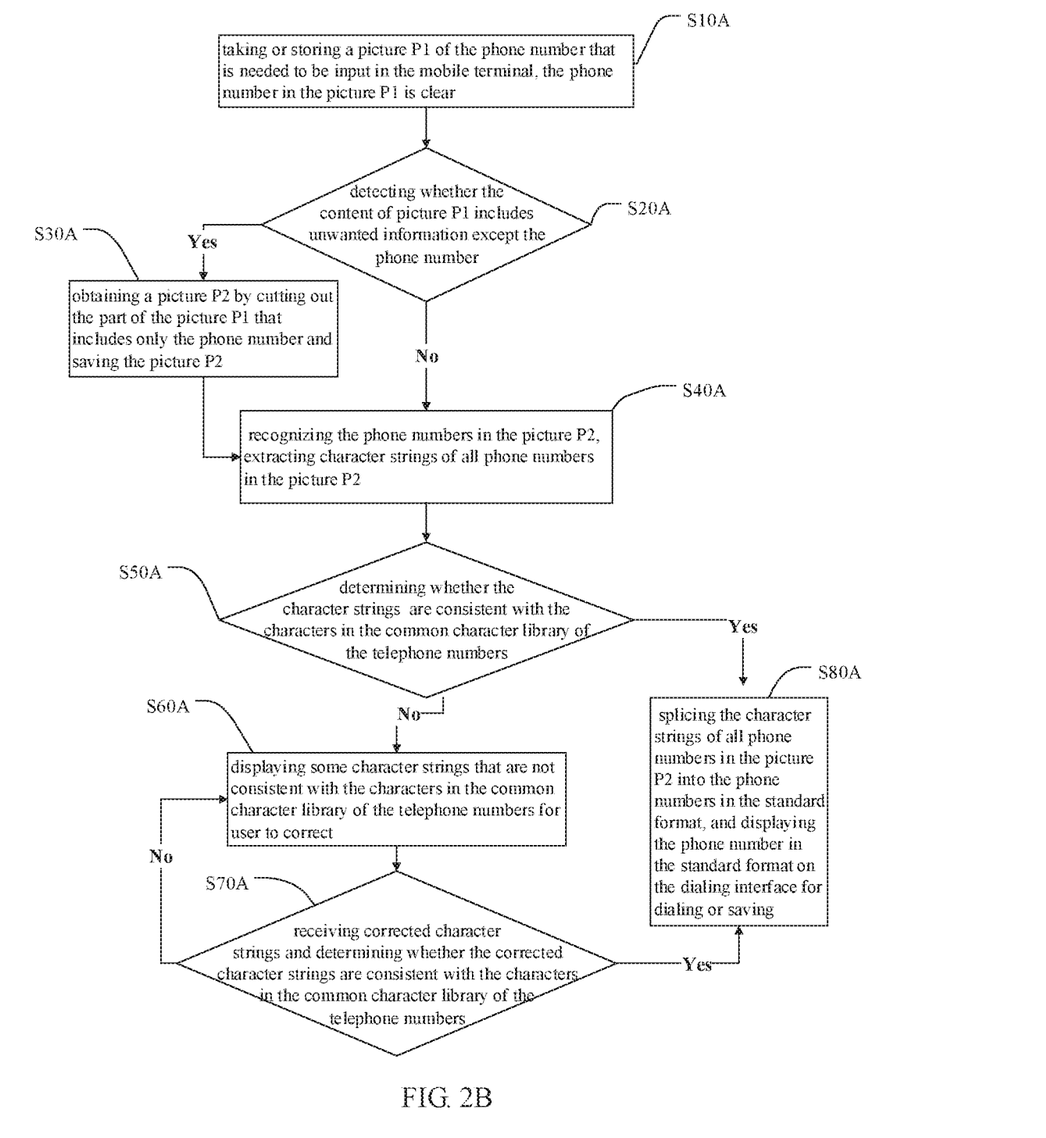
FIG. 2B is a flowchart of another embodiment of the method for inputting and processing phone number of this disclosure.

As shown in FIG. 2B, the method for inputting and processing phone number of another embodiment is described in detail as following.

Action 10A, taking or storing a picture P1 of the phone number that is needed to be input in the mobile terminal, the phone number in the picture P1 is clear, and go to action S20A.

Action 20A, detecting whether the content of picture P1 includes unwanted information except the phone number; if yes, go to action S30A; if no, go to action S40A and the picture P1 is used as the picture P2 of action 40A.

Action 30A, obtaining a picture P2 by cutting out the part of the picture P1 that includes only the phone number and saving the picture P2, and go to action S40A.

Action 40A, recognizing the phone numbers in the picture P2, extracting character strings of all phone numbers in the picture P2, and then go to action S50A.

Action 50A, determining whether the character strings of all phone numbers in the picture P2 are consistent with the characters in the common character library of the phone numbers; if yes, go to action S80A; if no, go to action S60A.

Action 60A, displaying some character strings that are not consistent with the characters in the common character library of the phone numbers for user to correct; then go to action S70A.

Action 70A, receiving corrected character strings and determining whether the corrected character strings are consistent with the characters in the common character library of the phone numbers; if yes, go to action S80A; if no, go back to action S60A.

Action 80A, splicing the character strings of all phone numbers in the picture P2 into the phone numbers in the standard format, and displaying the phone number in the standard format on the dialing interface for dialing or saving.

Figure 3:
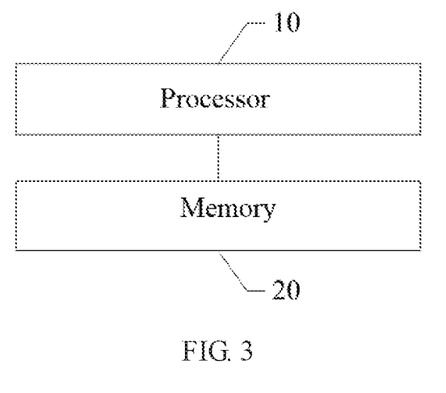
FIG. 3 is a functional block diagram of one embodiment of a mobile terminal of this disclosure.

A mobile terminal is also provided in one embodiment, as shown in FIG. 3. The mobile terminal can be a mobile phone (or tablet computer). The mobile terminal can include a processor 10, a picture editing tool (not shown in the figure), and a memory 20 connected to the processor 10.

The memory 20 stores a program of the method for inputting and processing phone number. The program of the method for inputting and processing phone number is executed by the processor 10, so that the method for inputting and processing phone number is realized as described in detail above.

In one embodiment, the processor 10 may be a central processing unit (CPU), a microprocessor, or other data processing chip used for running program codes or processing data stored in the memory 20, such as executing the program for inputting and processing phone number, etc.

A non-transitory computer-readable storage medium which stores a program of the method for inputting and processing phone number is also provided in one embodiment. When the program of the method for inputting and processing phone number is executed by the processor 10, the method for inputting and processing phone number is realized as described in detail above.

To summarize, this disclosure provides a method for inputting and processing phone numbers, a mobile terminal and a storage medium. The method for inputting and processing phone numbers includes: taking or storing a picture P1 of the phone number that is needed to be input in the mobile terminal; obtaining a picture P2 including only the phone number by automatically processing the picture P1 and saving the picture P2; obtaining editable character strings of all phone numbers in the picture P2 by automatically recognizing the phone numbers in the picture P2, and determining whether the format of the editable character strings is consistent with the standard format of the contact information of the mobile terminal; when the format of all the extracted phone numbers from picture P2 is consistent with the standard format of the contact information of the mobile terminal, the extracted phone numbers are displayed on the dialing interface for dialing or saving. The method for inputting and processing phone number can extract the phone number from a picture of the phone number by recognizing the picture. Thus, the method for inputting and processing phone number can solve the problems of long time and low accuracy caused by manual inputting the phone number, realize rapid and accurate inputting of the phone number, save inputting time, and improve inputting efficiency.

It is to be understood that the above-described exemplary embodiments are intended to illustrate rather than limit the disclosure. Any elements described in accordance with any exemplary embodiments is understood that they can be used in addition or substituted in other exemplary embodiments. Exemplary embodiments can also be used together. Variations can be made to the exemplary embodiments without departing from the spirit of the disclosure. The above-described exemplary embodiments illustrate the scope of the disclosure but do not restrict the scope of the disclosure.

Depending on the exemplary embodiment, certain of the actions of methods described can be removed, others can be added, and the sequence of actions can be altered. It is also to be understood that the description and the claims drawn to a method may include some indication in reference to certain actions. However, the indication used is only to be viewed for identification purposes and not as a suggestion as to an order for the actions.

What is claimed is:

1. A method for inputting and processing phone number in a mobile terminal, comprising:
    acquiring a picture P1 comprising a phone number;
    obtaining a picture P2 comprising only the phone number by automatically processing the picture P1 and saving the picture P2;
    obtaining editable character strings of the phone number in the picture P2 by automatically recognizing the phone number in the picture P2;
    determining whether a format of the editable character strings of the phone number in the picture P2 is consistent with a standard format of the contact information of the mobile terminal; and
    in response to the format of the character strings of the phone number in the picture P2 being consistent with the standard format of the contact information of the mobile terminal, displaying the phone number in the picture P2 in the dialing interface for dialing or saving.

2. The method of claim 1, wherein the obtaining the picture P2 comprising only the phone number by automatically processing the picture P1 comprises:
    checking whether the picture P1 comprises an unwanted information except the phone number;
    in response to the picture P1 comprising the unwanted information except the phone number, cutting out a part of the picture P1 that comprises only the phone number and saving as the picture P2.

3. The method of claim 2, wherein the obtaining the picture P2 comprising only the phone number by automatically processing the picture P1 further comprises:
    in response to the picture P1 not comprising the unwanted information except the phone number, keeping the picture P1 unchanged and saving as the picture P2.

4. The method of claim 1, wherein the picture P2 comprises a plurality of phone numbers; the editable character strings of all phone numbers in the picture P2 are obtained by automatically recognizing the phone numbers in the picture P2 and compared with the standard format of the contact information of the mobile terminal.

5. The method of claim 4, wherein in response to the format of the character strings of all phone numbers in the picture P2 being consistent with the standard format of the contact information of the mobile terminal, combining and splicing all the character strings into the plurality of phone numbers in the standard format; and displaying the plurality of phone numbers in the dialing interface and arranged in the form of queue.

6. The method of claim 1, further comprising in response to the format of the character strings of the phone number in the picture P2 being not consistent with the standard format of the contact information of the mobile terminal, displaying the phone number in the picture P2 in a modifying interface for correcting.

7. The method of claim 6, further comprising receiving corrected character strings of the phone number in the picture P2; and determining whether the format of the corrected character strings of the phone number in the picture P2 is consistent with the standard format of the contact information of the mobile terminal.

8. A mobile terminal, comprising a picture editing tool, a processor and a memory connected to the processor; the memory stores a program of a method for inputting and processing phone number, and the program is executed by a processor to realize the method for inputting and processing phone number, wherein the method for inputting and processing phone number comprises:
    acquiring a picture P1 comprising a phone number;
    obtaining a picture P2 comprising only the phone number by automatically processing the picture P1 and saving the picture P2;
    obtaining editable character strings of the phone number in the picture P2 by automatically recognizing the phone number in the picture P2;

determining whether a format of the editable character strings of the phone number in the picture P2 is consistent with a standard format of the contact information of the mobile terminal; and in response to the format of the character strings of the phone number in the picture P2 being consistent with the standard format of the contact information of the mobile terminal, displaying the phone number in the picture P2 in the dialing interface for dialing or saving.

9. The mobile terminal of claim 8, wherein the obtaining the picture P2 comprising only the phone number by automatically processing the picture P1 comprises:

checking whether the picture P1 comprises an unwanted information except the phone number;

in response to the picture P1 comprising the unwanted information except the phone number, cutting out a part of the picture P1 that comprises only the phone number and saving as the picture P2.

10. The mobile terminal of claim 9, wherein the obtaining the picture P2 comprising only the phone number by automatically processing the picture P1 further comprises:

in response to the picture P1 not comprising the unwanted information except the phone number, keeping the picture P1 unchanged and saving as the picture P2.

11. The mobile terminal of claim 8, wherein the picture P2 comprises a plurality of phone numbers; the editable character strings of all phone numbers in the picture P2 are obtained by automatically recognizing the phone numbers in the picture P2 and compared with the standard format of the contact information of the mobile terminal.

12. The mobile terminal of claim 11, wherein in response to the format of the character strings of all phone numbers in the picture P2 being consistent with the standard format of the contact information of the mobile terminal, combining and splicing all the character strings into the plurality of phone numbers in the standard format; and displaying the plurality of phone numbers in the dialing interface and arranged in the form of queue.

13. The mobile terminal of claim 8, wherein the method for inputting and processing phone number further comprises: in response to the format of the character strings of the phone number in the picture P2 being not consistent with the standard format of the contact information of the mobile terminal, displaying the phone number in the picture P2 in a modifying interface for correcting.

14. The mobile terminal of claim 13, wherein the method for inputting and processing phone number further comprises: receiving corrected character strings of the phone number in the picture P2; and determining whether the format of the corrected character strings of the phone number in the picture P2 is consistent with the standard format of the contact information of the mobile terminal.

15. A non-transitory computer-readable storage medium, storing a program of the method for inputting and processing phone number, wherein the program is executed by a processor to realize the method for inputting and processing phone number, the method for inputting and processing phone number comprises:

acquiring a picture P1 comprising a phone number;

obtaining a picture P2 comprising only the phone number by automatically processing the picture P1 and saving the picture P2;

obtaining editable character strings of the phone number in the picture P2 by automatically recognizing the phone number in the picture P2;

determining whether a format of the editable character strings of the phone number in the picture P2 is consistent with a standard format of the contact information of the mobile terminal;

in response to the format of the character strings of the phone number in the picture P2 being consistent with the standard format of the contact information of the mobile terminal, displaying the phone number in the picture P2 in the dialing interface for dialing or saving; and in response to the format of the character strings of the phone number in the picture P2 being not consistent with the standard format of the contact information of the mobile terminal, displaying the phone number in the picture P2 is displayed in a modifying interface for correcting.

16. The storage medium of claim 15, wherein the obtaining the picture P2 comprising only the phone number by automatically processing the picture P1 comprises:

checking whether the picture P1 comprises an unwanted information except the phone number;

in response to the picture P1 comprising the unwanted information except the phone number, cutting out a part of the picture P1 that comprises only the phone number and saving as the picture P2;

in response to the picture P1 not comprising the unwanted information except the phone number, keeping the picture P1 unchanged and saving as the picture P2.

17. The storage medium of claim 15, wherein the picture P2 comprises a plurality of phone numbers; the editable character strings of all phone numbers in the picture P2 are obtained by automatically recognizing the phone numbers in the picture P2 and compared with the standard format of the contact information of the mobile terminal.

18. The storage medium of claim 17, wherein in response to the format of the character strings of all phone numbers in the picture P2 being consistent with the standard format of the contact information of the mobile terminal, combining and splicing all the character strings into the plurality of phone numbers in the standard format, and displaying the plurality of phone numbers in the dialing interface and arranged in the form of queue.

19. The storage medium of claim 15, wherein the method for inputting and processing phone number further comprises: in response to the format of the character strings of the phone number in the picture P2 being not consistent with the standard format of the contact information of the mobile terminal, displaying the phone number in the picture P2 in a modifying interface for correcting.

20. The storage medium of claim 19, wherein the method for inputting and processing phone number further comprises: receiving corrected character strings of the phone number in the picture P2; and determining whether the format of the corrected character strings of the phone number in the picture P2 is consistent with the standard format of the contact information of the mobile terminal.

* * * * *